(12) United States Patent
Harrison et al.

(10) Patent No.: US 11,377,524 B2
(45) Date of Patent: Jul. 5, 2022

(54) VENT CLEANING OF RUBBER MOLDS

(71) Applicant: RUBRECO INC., Fredericton (CA)

(72) Inventors: Brian H. Harrison, Kanata (CA); Hurdon A. Hooper, Fredericton (CA); Mathew Ness, Fredericton (CA)

(73) Assignee: Rubreco, Inc., Fredericton (CA)

( * ) Notice: Subject to any disclaimer, the term of this patent is extended or adjusted under 35 U.S.C. 154(b) by 211 days.

(21) Appl. No.: 16/635,432

(22) PCT Filed: Jul. 30, 2018

(86) PCT No.: PCT/CA2018/050925
§ 371 (c)(1),
(2) Date: Jan. 30, 2020

(87) PCT Pub. No.: WO2019/023792
PCT Pub. Date: Feb. 7, 2019

(65) Prior Publication Data
US 2021/0087343 A1 Mar. 25, 2021

Related U.S. Application Data

(60) Provisional application No. 62/538,897, filed on Jul. 31, 2017.

(51) Int. Cl.
*C08G 85/00* (2006.01)
*C08J 11/14* (2006.01)
*C08J 11/20* (2006.01)

(52) U.S. Cl.
CPC ............. *C08G 85/008* (2013.01); *C08J 11/14* (2013.01); *C08J 11/20* (2013.01); *C08J 2319/00* (2013.01)

(58) Field of Classification Search
CPC ......... C08G 85/008; C08J 11/14; C08J 11/20; C08J 2317/00; C08J 2319/00; C08J 2321/00; Y02W 30/62
See application file for complete search history.

(56) References Cited

U.S. PATENT DOCUMENTS

2004/0214906 A1  10/2004  Harrison et al.
2006/0116431 A1* 6/2006  McFarlane ............... C08J 11/10
                                                              521/41

OTHER PUBLICATIONS

Fragassa et al., "Technology Assessment of Tire Mould Cleaning Systems and Quality Finishing", International Journal for Quality Research, 10(3), pp. 523-546 (Year: 2006).*

(Continued)

*Primary Examiner* — Frances Tischler
(74) *Attorney, Agent, or Firm* — Shumaker & Sieffert, P.A.

(57) ABSTRACT

Vents and micro-structures of rubber molds may become clogged with rubber that is difficult to remove. These vents and micro-structures can be cleaned of rubber, even if heat aged, by subjecting the mold to high temperatures in the presence of a solvent to devulcanize any rubber present. If the rubber used with the mold being cleaned includes carbon black, a solvent may be used to dissolve the devulcanized polymer, leaving the carbon black which can be removed by water jets or other cleaning means.

12 Claims, 5 Drawing Sheets

(56) References Cited

OTHER PUBLICATIONS

International Search Report and Written Opinion of International Application No. PCT/CA2018/050925, dated Oct. 28, 2018, 7 pp.
Tripahty et al., "Rubber Plasticizers From Degraded/Devulcanized Scrap Rubber: a Method of Recycling Waste Rubber," Polymer Engineering and Science, vol. 44, No. 7, Jul. 1, 2004, 12 pp.
Ishiaku et al., "Determination of Optimum De-Link R Concentration in a Recycled Rubber Compound," Polymer Testing, vol. 18, Dec. 1999, pp. 621-633.

* cited by examiner

FIG. 5 ical Field

The current disclosure relates cleaning structures, such as molds, used in forming rubber products having fillers, such as carbon black, and in particular to removing vulcanized rubber remaining in the structures after forming the rubber products.

BACKGROUND

Molds used to manufacture rubber products like car tires often have small holes to help with the manufacturing process. The holes allow gas to vent during the vulcanization process in making the rubber product such as tires. While rubber is being injected or pressed into the mold, there are risks of air bubbles forming between the rubber and the mold, and if not allowed to escape, the air bubbles can prevent the rubber from getting in all the intricate patterns of the mold, thus producing a malformed product. These vent holes can sometimes be seen on new tires as small hair-like structures, known as vent spews. The holes of the molds can be very small, such as fractions of a millimeter.

During use, the vents can become filled with vulcanized rubber, which can be difficult to remove. As the hole can be many millimeters in depth they can be difficult to clean by conventional methods. Current cleaning technologies include lasers, $CO_2$ dry ice blasting, and abrasive particle blasting. They are primarily for cleaning the surface of molds and are not that practical for cleaning the small holes.

SUMMARY

In accordance with the present disclosure, there is provided a method of removing vulcanized rubber having filler from a structure comprising: subjecting the structure and the vulcanized rubber to a high temperature of between 250° C. and 320° C. in the presence of a devulcanization solvent for a reaction time sufficient to devulcanize the vulcanized rubber; subjecting the structure and devulcanized rubber to a dissolving solvent to dissolve rubber polymer from the devulcanized rubber; and removing filler remaining from the vulcanized rubber from the structure.

In a further embodiment, the method further comprises pre-treating the structure and the vulcanized rubber with the devulcanization solvent.

In a further embodiment of the method, the pre-treating is carried out at an elevated temperature at about the boiling point of the devulcanization solvent.

In a further embodiment of the method, the vulcanized rubber on the structure comprises heat aged vulcanized rubber.

In a further embodiment of the method, the structure comprises one or more mold surfaces of a mold.

In a further embodiment of the method, at least one of the one or more mold surfaces comprises at least one of: a surface within a vent of the mold; a surface of a micro-slot vent of the mold; a surface of a micro-structure of the mold; a surface of a spring vent within the mold; and a surface between puzzle mold pieces.

In a further embodiment of the method, the devulcanization solvent and the dissolving solvent are the same solvent.

In a further embodiment of the method, the devulcanization solvent and the dissolving solvent comprise toluene.

In a further embodiment of the method, the devulcanization solvent comprises water and the dissolving solvent comprises toluene.

In a further embodiment of the method, the devulcanization solvent and the dissolving solvent are selected from the group consisting of: toluene; benzene; xylene; cyclohexanes; hexanes; heptanes; and chloroform.

In a further embodiment of the method, removing the filler comprises removing the filler using one or more of: a water jet; an air jet; and a pressure washer.

In a further embodiment of the method, the filler comprises carbon black.

BRIEF DESCRIPTION OF THE DRAWINGS

Features, aspects and advantages of the present disclosure will become better understood with regard to the following description and accompanying drawings in which.

DETAILED DESCRIPTION

Molds are used to make a wide variety of products from rubber. The rubber vulcanization process typically exposes the rubber that is placed into the mold to temperatures in the range 130 to 170° C. for several minutes before the product is ejected from the mold. Any rubber that remains on surfaces of the mold and is not removed will be exposed to multiple heating cycles. As is known, when rubber is exposed to elevated temperatures for extended times it heat ages and can significantly change its chemical composition/structure and physical properties. Although not wishing to be bound by theory, it is believed that heat aging vulcanized rubber changes the number and proportion of monosulfilic, disulfilic, and polysulfilic crosslinks in the rubber converting polysulfilic to disulfilic and monosulfilic crosslinks. This results in considerably more cross links and a change in the physical properties of the heat-aged vulcanized rubber. Exposure to air at elevated temperatures can also cause some oxidation of the material remaining on mold surfaces. The heat aged rubber becomes harder and more brittle, with an increase in modulus and a decrease in tensile and elongation at break.

When the mold needs to be cleaned, any vulcanized rubber remaining on mold surfaces may or may not be physically or chemically identical to the rubber products being manufactured depending upon whether the remaining rubber has been heat aged. The cleaning process described further herein is able to remove both vulcanized rubber as well as heat-aged vulcanized rubber from mold surfaces. While the process described herein is able to remove remaining rubber from large surfaces of the mold that are easily accessible, it is particularly well suited for removing remaining rubber from surfaces that have limited physical access such as surfaces of vents in the mold. Removing normal or heat aged vulcanized rubber from within these vents is not simple and quite different from removing it from the surface of a mold where direct access is possible.

The molds used in forming vulcanized rubber products may include small vent holes to allow gas to escape from the mold. The molds may have other small structures similar to the vent structures such as cavities, slots, micro-slots, micro-grooves or other small structures. The structures of the molds can be cut directly into the mold, for example by a laser, or may be formed by sandwiching mold pieces together having the appropriate spacing between them, which may be referred to as puzzle molds. Further, the molds may include separate structures that are inserted into the mold such as spring vents. Spring vents that have a spring valve as well as micro-slots and micro-cavities within the vent. Rubber can be trapped within, or on, any of the surfaces of these structures of the mold and can be difficult to remove as a result of the limited physical access to the surfaces due to the size and shape of the structures. The rubber remaining on these surfaces can be come heat aged, making its removal more difficult, and ultimately leading to a mold that is no longer useful.

The remaining of the description refers to a mold cleaning process for removing vulcanized rubber, including heat-aged vulcanized rubber, from the surface of mold vents. The same cleaning process can be used to remove vulcanized rubber, including heat-aged vulcanized rubber, from all surfaces of the mold, including surfaces that have limited physical access due, at least in part, to the size and shape of mold structures. That is, while the mold cleaning process is described with reference to cleaning vents for simplicity and clarity of the description, it can be used to clean surfaces of the mold structures including, for example cavities, slots, micro-slots, micro-grooves, spring vents or other small structures formed in or on the mold, or inserted into the mold.

The mold cleaning process described herein includes the devulcanization of the rubber in the vents of the mold, even if the rubber has been heat-aged without affecting the mold itself, such as by corrosion. Further, the mold cleaning process does not cause the formation of "char", which bonds carbon black particles together making it very difficult to remove them from the vent. Once the rubber has been devulcanized the polymer is removed from the vent by solvent extraction, and the remaining carbon black, or other types of filler, that remains in the vent can be removed.

Figure 1:
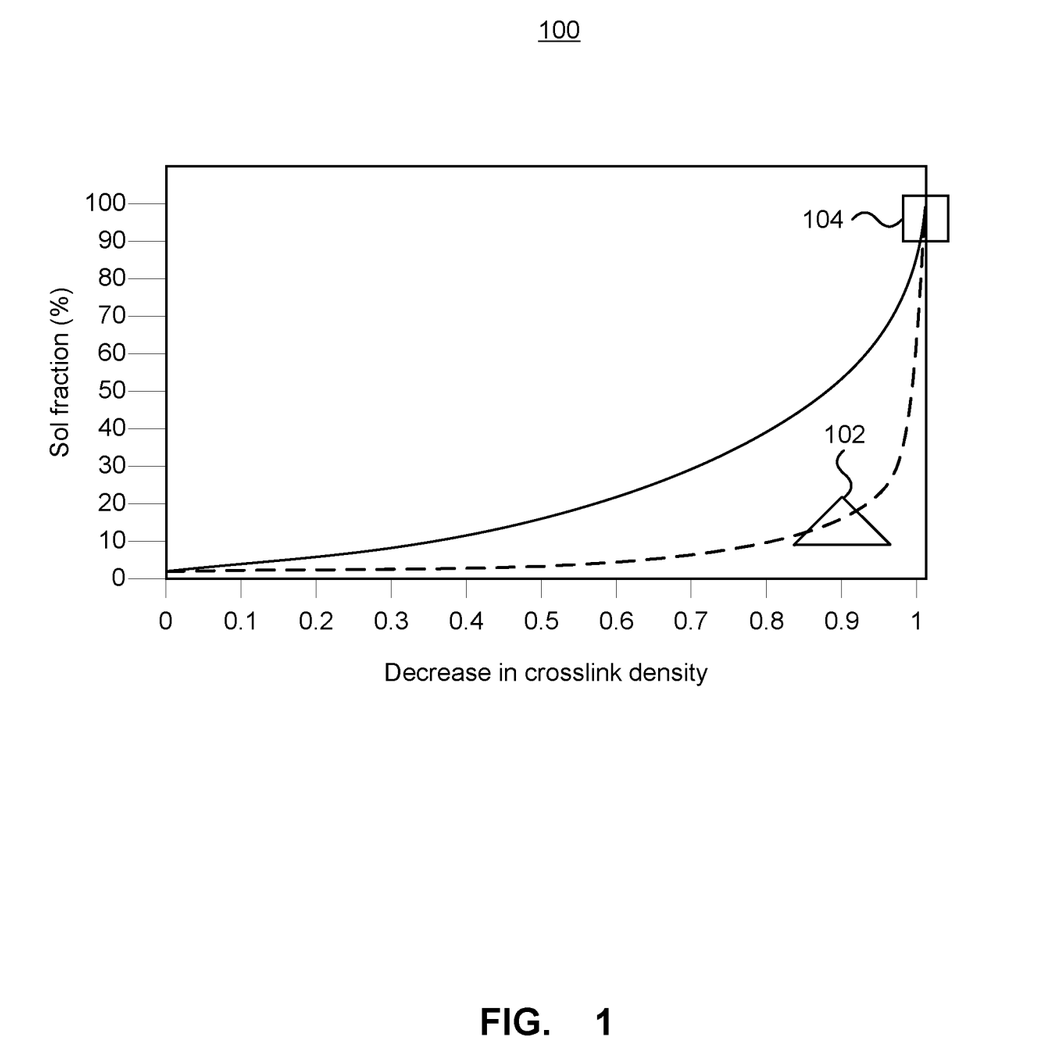
FIG. 1 depicts a Horikx plot.

FIG. 1 depicts a Horikx plot. Removing the devulcanized polymer by solvent extraction is a complex problem and can be explained using a "Horikx Plot". A Horikx Plot shows what happens when you devulcanize rubber. It looks at the percentage of the polymer that can be removed by a solvent versus the percent devulcanization, or the decrease in cross link density, for the two processes that occur during devulcanization, that is breaking the sulphur-sulphur cross links formed by the vulcanization process, or breaking the polymer molecules or chains themselves. Generally, when devulcanizing rubber that will be reused, it is desirable to break the sulphur-sulphur cross links without breaking the polymer molecules. For this, the process should be carried out under conditions that produces a product with properties in the region of the triangle 102 on the curve of the Horikx plot 100. For mold cleaning, it is not desirable to be in a region where only a small amount of the polymer can be removed by a solvent, instead it is desirable to be in the region of the curve represented by the square 104. In this region, some chain scission can be expected to occur, however for mold cleaning this is not a large problem since the devulcanized products are not being reused and mixed into new rubber. While chain scission is acceptable for mold cleaning, it is desirable to be minimized, or at least kept low, since small molecules resulting from the chain scission can form a bond between adjacent carbon black particles causing "char" that would make the remaining carbon black residue hard and difficult to remove from the vents.

As breaking the polymer chains can result in char formation that can bond the carbon black particles together, it is preferable that the polymer be removed as fast and soon as possible during the devulcanization process when the polymer molecules are still long and do not form a char. In order to remove polymer quickly, a solvent that will devulcanize the rubber and, at the same time, remove it from the vents may be used. Toluene can be used as a solvent for both the devulcanization and dissolving steps as it devulcanizes the rubber and then dissolves the polymer into the toluene being used in one step. Other solvents may include, for example, benzene, xylene, cyclohexanes, hexanes, heptanes, and chloroform.

It is possible that different solvents could be used for the devulcanization and dissolving steps, for example using a first solvent to devulcanize the rubber in the first step followed by an exposure to a second solvent that extracts the polymer as a second step. It is possible to use, for example, water as the devulcanizing solvent and toluene as the dissolving solvent.

When the polymer in rubbers are heated above a certain temperature the very long polymer molecules break down into smaller and smaller molecules, referred to as depolymerization, eventually forming a "char" that binds the remaining carbon black particles together. Removing the polymer molecules before they completely break down and form a char is desirable when cleaning a mold, as well as using temperatures that reduce an amount of depolymerization that occurs. Thermogravimetric analysis has shown that breaking down the polymer molecules to ones small enough to become volatilized (i.e. pyrolysis) takes temperatures in excess of 350° C.

The devulcanization process for the heat aged rubber trapped in the mold's vents will be different to the devulcanization process for normal rubbers as the heat-aged rubbers are harder and have significantly more monosulfidic sulphur cross links that need to be broken affecting the process.

The devulcanization process may be affected by the width and length of the vents. However, an understanding of the process conditions can be achieved by looking at particles of the rubber that is being used in the molds that has been heat aged. In testing of the process described herein vents as narrow as 30 microns have been cleaned. Conditions that allow the devulcanized polymer to be extracted from these vents are described further below. The polymer molecules that are removed during this devulcanization process can be recovered from the solvent and studied. The dissolved polymer extracted from the vents can be recovered by evaporating the solvent to dryness. While some depolymerization occurs, the molecular weights of the extracted polymer are still very high at about 100,000.

The rubber in the vent is primarily vulcanized rubber/polymer and carbon black. The cleaning is a two-step process. In the first step the rubber in the vent is completely devulcanized in a solvent at elevated temperatures and pressures, and, either after the devulcanization or at the same time as the devulcanization, the devulcanized rubber molecules are removed with the solvent before charring can occur, that is the breakdown of the polymer to small molecules that can bind with the carbon black forming a hard lumps of carbon. In the second step the carbon black particles that remain are removed from the vent. Since the polymer has been extracted from the carbon black particles during the first step, the cleaning of the carbon black from the vents is significantly easier and can be achieved with simple cleaning techniques such as with a pressure washer or water jet. Other means of removing the remaining carbon black from the vents may include air jets or other removal methods as will be apparent to one of ordinary skill in the art.

The solvent used in the devulcanization process should not be corrosive to the molds being treated. For that reason, organic solvents are preferable. The solvent used may dissolve the polymer/rubber molecules being processed so that the polymer may be extracted as the rubber is devulcanized. Different solvents are available for different rubbers which have varying degrees of solubility. These include a range of aromatic and aliphatic compounds, including for example cyclohexanes, hexanes, heptanes, benzene, xylene, chloroform, THF, etc. Based on test results toluene is preferable although other solvents can be used. Further, although described as using a single solvent for devulcanization and extraction of the polymer, it is possible to use different solvents for the devulcanization of the rubber and for the extraction of the devulcanized rubber polymer.

The solvent should also completely devulcanize the heat aged vulcanized rubber so that all of the vulcanized rubber remaining in the molds can be cleaned. Toluene has also been found to be very effective.

Solvents such as toluene are sometimes referred to as swelling solvents and can be used to swell rubber, which reduces it physical properties such as strength etc. In such a process, rubber is brought in contact with the swelling solvent. Rubber can typically take up 2 to 5 times its own weight in swelling solvent. Once swollen, shear forces are typically applied to the rubber to break it up. This is a type of devulcanization process that is usually referred to as a reclamation process. However, such reclamation processes do not work in cleaning molds. The vulcanized rubber in the vents cannot swell as it is contained by the walls of the vents, nor can shear forces be applied to it. The cleaning process described here is quite different from the reclamation of rubber using a swelling solvent as no swelling can take place with the rubber that is contained by the walls of the vents.

In addition, the geometry of the vents makes it very difficult for the solvent to enter into the rubber trapped within the vent. The rubber trapped in vent is much like a very thin film of rubber, however, the only place the solvent can enter into the rubber are the edges, which are, for example, 30 microns wide. The area of these edges exposed to the solvent is very small and so diffusion of solvent into the rubber is very slow, especially at room temperature, and can take a very long time. The devulcanization process for the mold cleaning is based on solvent entering the rubber and breaking the sulphur bonds. Getting solvent into the rubber is therefore an important consideration. One might think that as the temperature rises and the pressure in the reactor increases the solvent is forced into the rubber, however this appears to be incorrect. Tests have shown that pressure can impede the entry of solvent into the rubber. For example, if the rubber (from tires) is placed in water (at room temperature), and pressure is applied immediately, the rate uptake of water is about a quarter of that without pressure being applied. Tests conducted have shown that, under normal circumstances, the high pressures appears to compact the rubber making it much more difficult for solvent to enter into the rubber and the polymer molecules to be extracted after devulcanization.

Rubber molecules can normally move relative one another as the rubber is, for example, stretched. The rubber may be modeled as a tube. In the Tube Model, the rubber molecules are folded up like a concertina within tubes and the rubber molecules can move freely within these tubes. There is therefore a void space between the rubber molecules, both between the tubes and inside the tubes, which under normal circumstances is filled with air. This can be thought of as the space through which solvents enter into the rubber. The compaction effect resulting from high pressure means the void space between the rubber molecules becomes smaller and experiments have shown that it then becomes much more difficult for the solvent to enter into the void space and the uptake of solvent is significantly reduced. The compaction effect therefore reduces the uptake of solvent by the rubber and inhibits the devulcanization process.

Research also appears to show that this compaction effect also causes additional entanglement of the polymer molecules, and, as a result, the devulcanized material becomes much harder and the polymer more difficult to remove. It has also been found during this research that replacing the air with solvent minimizes this effect. That is replacing the air, which is compressible, with a liquid that is not compressible, prevents the physical entanglement and makes it much easier to remove the devulcanized rubber molecules.

Pre-treatment of the rubber with solvent to fill this void space with solvent, and in particular a liquid versus a compressible gas, prevents or reduces this compaction of the rubber as pressure is applied to it. In the process described here pre-conditioning is advisable to prevent this compaction effect that limits the entry of the solvent into the rubber and the removal of the polymer molecules after devulcanization.

However, as noted above, the replacement of the air by solvent is very slow at room temperature. Heating the solvent increases the rate at which it can be replaced but if the temperature becomes too high the pressures created by the solvent, its saturated vapour pressure, can cause the rubber molecules to be compacted. Temperatures slightly above the boiling point at atmospheric pressure of the solvent are preferred. Replacing the void space with solvent, and in particular with a solvent at an elevated temperature of approximately the boiling point of the solvent, is referred to as pre-conditioning of the rubber. While pre-treatment is not essential, it can significantly reduce processing times in the reactor.

Processing times for cleaning vulcanized rubber, including heat aged vulcanized rubber, from molds can range from 1 to 6 hours depending on how much solvent is introduced during the pre-conditioning stage as well as how much polymer needs to be removed from the rubber and the vent geometry of the mold. Even when the rubber is devulcanized the polymer needs time to diffuse out of the devulcanized rubber, and out of the vent. The more distance the polymer needs to diffuse out of the vent the longer it takes. The processing time may further depend upon the rubber characteristics as well as the degree of the mold contamination.

The process conditions, and in particular the temperature and time, used to devulcanize the rubber will depend on the rubbers being used in the mold, as well as the level of mold contamination and the vent geometry. That is, different types of rubber need to be processed under slightly different conditions. The devulcanization reaction kinetics will be slower at lower temperatures, and so require longer reaction times, and faster at higher temperatures, and so require shorter reaction times. Devulcanization can occur are typically in the 250-320° C. range with pressures at or above the saturated vapour pressure of the solvent at the process temperature. Although reaction time will vary, typical reaction times may be in the range of 1-6 hours.

Reactors to accomplish this process are described in U.S. Pat. Nos. 9,403,136 and 9,278,324. The reactors may be joined together to allow for energy recovery by reducing the pressure in one reactor at the end of the process, causing the solvent to evaporate, and then condensing it in a second reactor. Venting the reactor at the end of the process, i.e. when at high temperature and pressure, in spurts can be used to help break up any carbon black particles in the vents as liquid solvent trapped within the particles evaporates. Standard pressure washers can be used to remove the remaining carbon black or other fillers from the vents. Other washing techniques may be used to remove remaining carbon black and other fillers.

Figure 2:
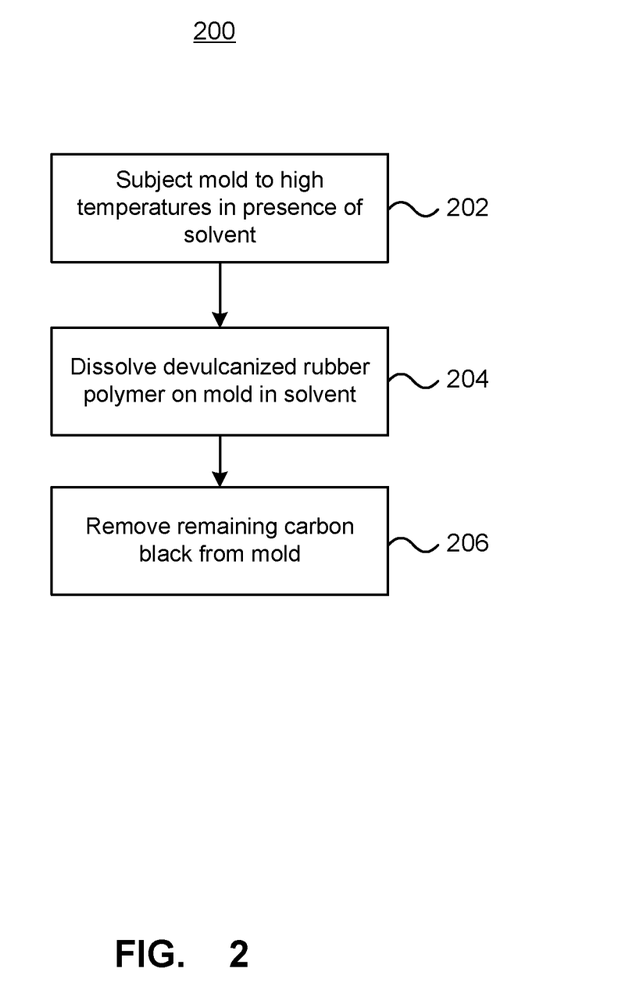
FIG. 2 depicts a method of cleaning vulcanized rubber from a mold.

FIG. 2 depicts a method of cleaning vulcanized rubber from a mold. The method 200 can be used to clean mold surfaces, including inaccessible surfaces such as the interior surface of vents, of vulcanized rubber, and heat-aged vulcanized rubber, that remains on the surface after removing the vulcanized rubber product from the mold. The mold, including remaining volcanized rubber that may or may not be heat aged, is subjected to high temperatures in the presence of a solvent (202) in order to completely devulcanize the vulcanized rubber. The mold, and rubber in the mold, may first be pre-treated or pre-conditioned with solvent at an elevated temperature to introduce solvent into the rubber to prevent or reduce compaction of the rubber in the mold at elevated pressures. The high temperatures are maintained for a reaction period of time in order to allow all of the vulcanized rubber to be devulcanized. The pressure of the reaction may be at or above the vapour pressure of the solvent. The devulcanized rubber polymer is dissolved from the mold into a solvent (204), which may be the same solvent used in devulcanizing the rubber or a different solvent. Once the polymer is extracted, only carbon black will remain on the mold, and it is removed from the mold (206). The carbon black can be removed from the mold by washing or other processes including, for example using a water jet, or possibly an air jet.

Figure 3:
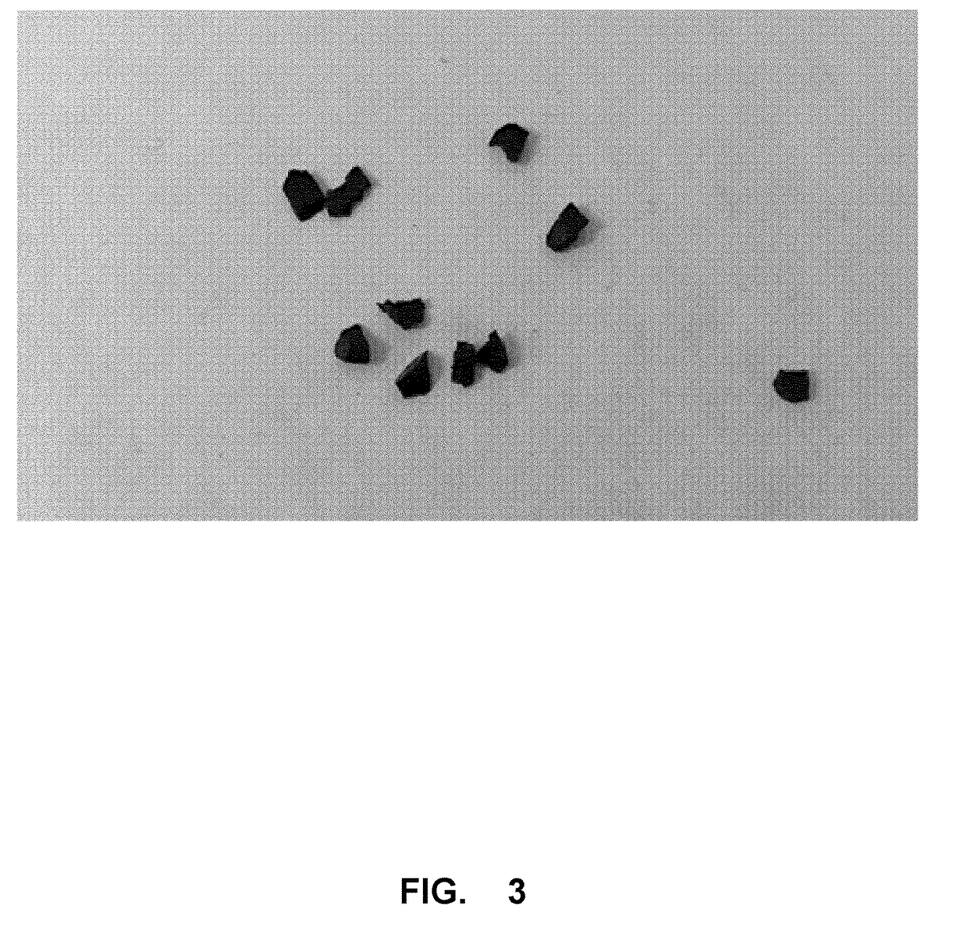
FIG. 3 depicts heat aged vulcanized rubber particles.
Figure 4:
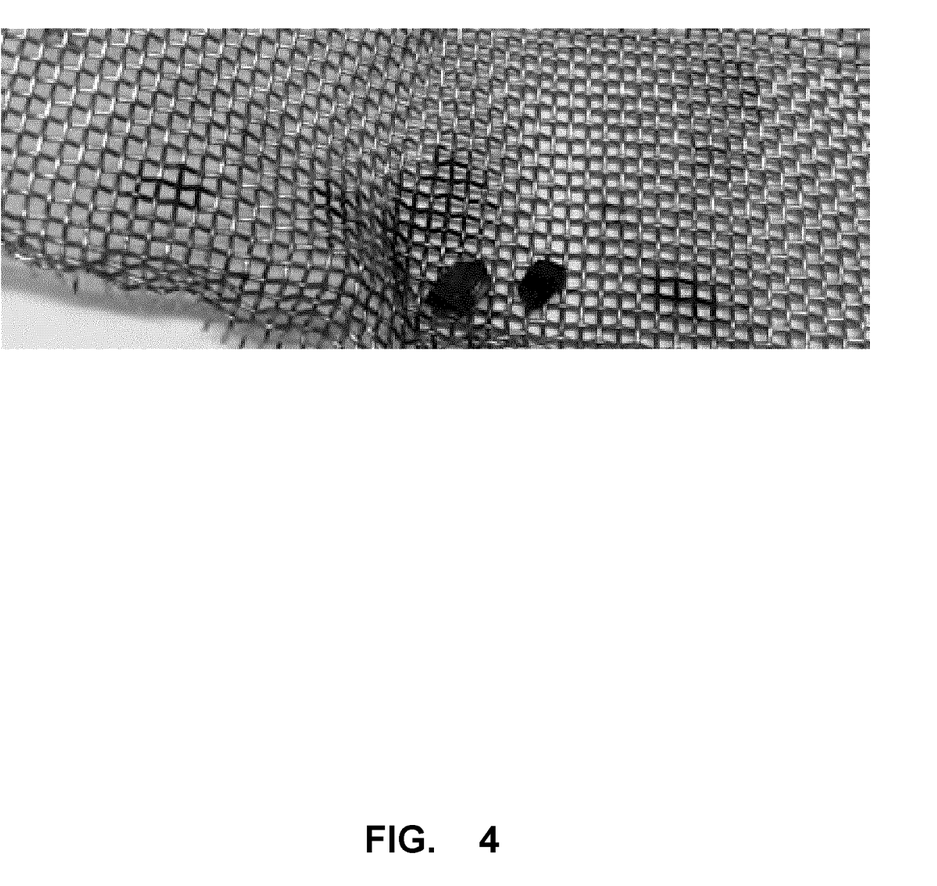
FIG. 4 depicts the heat aged vulcanized rubber particles of FIG. 3 after the devulcanization process of the current disclosure.
Figure 5:
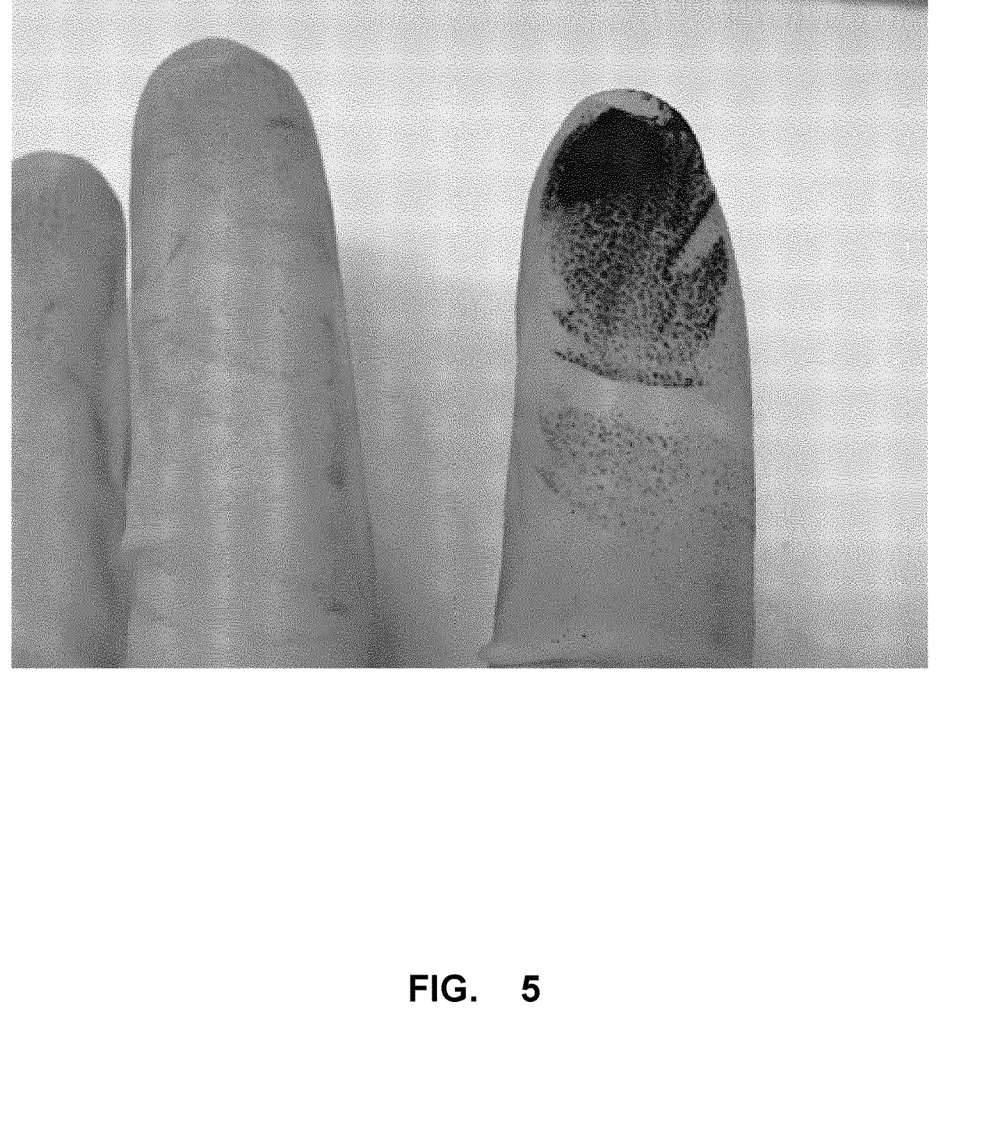
FIG. 5 depicts the remaining rubber particles of FIG. 4 after rolling between fingers.

In a first test, particles of heat aged tire rubber were devulcanized in toluene at 300° C. for one hour to look at the devulcanized sample and its ability to be removed by a pressure washer. While as noted above, rubber particles behave quite differently to the rubber in vents, this test demonstrates that devulcanization and the removal of the polymer from devulcanized rubber is possible. FIG. 3 shows 1-2 mm particles of heat aged vulcanized rubber before they were processed. FIG. 4 shows what remains of the particles of FIG. 3 after processing. As can be seen from FIG. 4 some of the particles were completely dispersed into the solvent, while some did not and retained their original shape. As can be seen in FIG. 5 when the remaining particles of FIG. 4 were rolled between a tester's fingers, the particles completely broke down into fine powder. This demonstrates that these processing conditions are ideal for this heat aged rubber, and the carbon black that remains after devulcanization, can be easily removed.

In a second test, cleaning of vents in a mold segment that were full of rubber was achieved. A mold segment with micro-vents 30 microns wide that had been used in a tire manufacturing process and was completely blocked with hard vulcanized rubber was pre-conditioned and processed in toluene at 290° C. for two hours. The vents were then cleaned with a water jet/pressure washer. The vents were then observed with a light behind the slot and was shown to be completely clean. In a similar test with a vent with a diameter 400 microns were cleaned the same way.

In a third test a mold segment with spring vents blocked with rubber was cleaned. The rubber was trapped between the surfaces of the valve in the spring vent and had also been pushed all the way through and out the back of the valve. The mold segment was cleaned by processing the segment in toluene, with pre-conditioning at 285° C. for two hours. The valves, which were closed, opened on treatment. The residual carbon black was then flushed out of the spring vents with solvent.

The mold cleaning process can remove or clean out vulcanized rubber that has been trapped in all types of molds for manufacturing rubber products and all types of venting systems used in them. The removal can be from the surface or from cavities or vents in the molds, including micro-vents. The process uses a solvent that can completely devulcanize normal or heat aged rubber without forming a char. The mold cleaning process uses a solvent that devulcanizes the rubber and removes the devulcanized rubber polymer before char is formed. A solvent could be used to devulcanize the rubber and then a second solvent used to extract the polymer however, this may be less desirable than using a single solvent for both the devulcanization and the extraction steps. Although tire rubber was tested, the mold cleaning process can be applied to a large number of different rubber types as long as a solvent is available to devulcanize the rubber that does not corrode the molds. Depending on the rubbers used and solvents used the process temperatures may be in the range 250-320° C. with pressures at or above the saturated vapour pressure of the solvent at the particular processing temperature. The mold cleaning process is applicable to all rubbers used to manufacture tires as well as for cleaning vulcanized rubber from other molds.

What is claimed is:

1. A method of removing vulcanized rubber having filler from a structure used during forming a vulcanized rubber product, the method comprising:
    subjecting the structure and the vulcanized rubber on at least one surface of the structure used during forming the vulcanized rubber product to a high temperature of between 250° C. and 320° C. in the presence of a devulcanization solvent for a reaction time sufficient to devulcanize the vulcanized rubber;
    subjecting the structure and devulcanized rubber to a dissolving solvent to dissolve rubber polymer from the devulcanized rubber leaving the filler on the at least one surface of the structure;
    extracting the dissolved rubber polymer from the structure; and
    removing the filler remaining on the at least one surface of the structure from the structure.

2. The method of claim 1, further comprising pre-treating the structure and the vulcanized rubber with the devulcanization solvent.

3. The method of claim 2, wherein the pre-treating is carried out at an elevated temperature at about the boiling point of the devulcanization solvent.

4. The method of claim 1, wherein the vulcanized rubber on the structure comprises heat aged vulcanized rubber.

5. The method of claim 1, wherein the structure comprises a mold.

6. The method of claim 5, wherein at least one surface of the mold comprises at least one of:
 a surface within a vent of the mold;
 a surface of a micro-slot vent of the mold;
 a surface of a micro-structure of the mold;
 a surface of a spring vent within the mold; and
 a surface between puzzle mold pieces.

7. The method of claim 1, wherein the devulcanization solvent and the dissolving solvent are the same solvent.

8. The method of claim 7, wherein the devulcanization solvent and the dissolving solvent comprise toluene.

9. The method of claim 1, wherein devulcanization is carried out at an elevated pressure and the devulcanization solvent comprises water, and wherein the dissolving solvent comprises toluene.

10. The method of claim 1, wherein the devulcanization solvent and the dissolving solvent are selected from the group consisting of:
 toluene;
 benzene;
 xylene;
 cyclohexanes;
 hexanes;
 heptanes; and
 chloroform.

11. The method of claim 1, wherein removing the filler comprises removing the filler using one or more of:
 a water jet;
 an air jet; and
 a pressure washer.

12. The method of claim 1, wherein the filler comprises carbon black.

* * * * *